(12) United States Patent
Sellers

(10) Patent No.: US 7,234,723 B2
(45) Date of Patent: Jun. 26, 2007

(54) BOLSTER SPRING SUSPENSION ASSEMBLY

(75) Inventor: Howard E. Sellers, Syaracuse, IN (US)

(73) Assignee: E-Z Ride Corp., Syracuse, IN (US)

( * ) Notice: Subject to any disclaimer, the term of this patent is extended or adjusted under 35 U.S.C. 154(b) by 83 days.

(21) Appl. No.: 10/726,318

(22) Filed: Dec. 2, 2003

(65) Prior Publication Data

US 2004/0262877 A1 Dec. 30, 2004

Related U.S. Application Data

(60) Provisional application No. 60/482,956, filed on Jun. 27, 2003.

(51) Int. Cl.
*B60G 5/00* (2006.01)
(52) U.S. Cl. .................. 280/686; 280/124.17; 280/146
(58) Field of Classification Search ........... 280/124.17, 280/124.175, 124.176, 124.165, 680, 686, 280/682, 146, 148; 267/52, 36, 1, 40, 30, 267/6, 7; 105/197.05, 197.1, 198.1, 200, 105/185
See application file for complete search history.

(56) References Cited

U.S. PATENT DOCUMENTS 3,606,376 A * 9/1971 Hickman ............. 280/124.165
5,560,641 A * 10/1996 Vogler .................. 280/124.163
5,676,356 A 10/1997 Ekonen et al.
6,019,384 A 2/2000 Finck
6,079,723 A 6/2000 Choi
6,206,407 B1 * 3/2001 Fuchs et al. ................. 280/686
6,585,286 B2 * 7/2003 Adema et al. .............. 280/677
2004/0155424 A1 * 8/2004 Hicks et al. ........... 280/124.17

FOREIGN PATENT DOCUMENTS

JP      09188117 A   *  7/1997
JP      09272320 A   * 10/1997

OTHER PUBLICATIONS

Haulmaax Heavy Duty Suspension Service Manual.

* cited by examiner

*Primary Examiner*—Paul N. Dickson
*Assistant Examiner*—Tiffany L. Webb
(74) *Attorney, Agent, or Firm*—Baker & Daniels LLP

(57) ABSTRACT

A bolster spring assembly is adapted for securement to a vehicle having a primary suspension system for securing an axle to the vehicle. The bolster spring assembly is located and secured between the leaf spring over the axle and the undercarriage of the vehicle as a supplement to the primary suspension system.

17 Claims, 4 Drawing Sheets

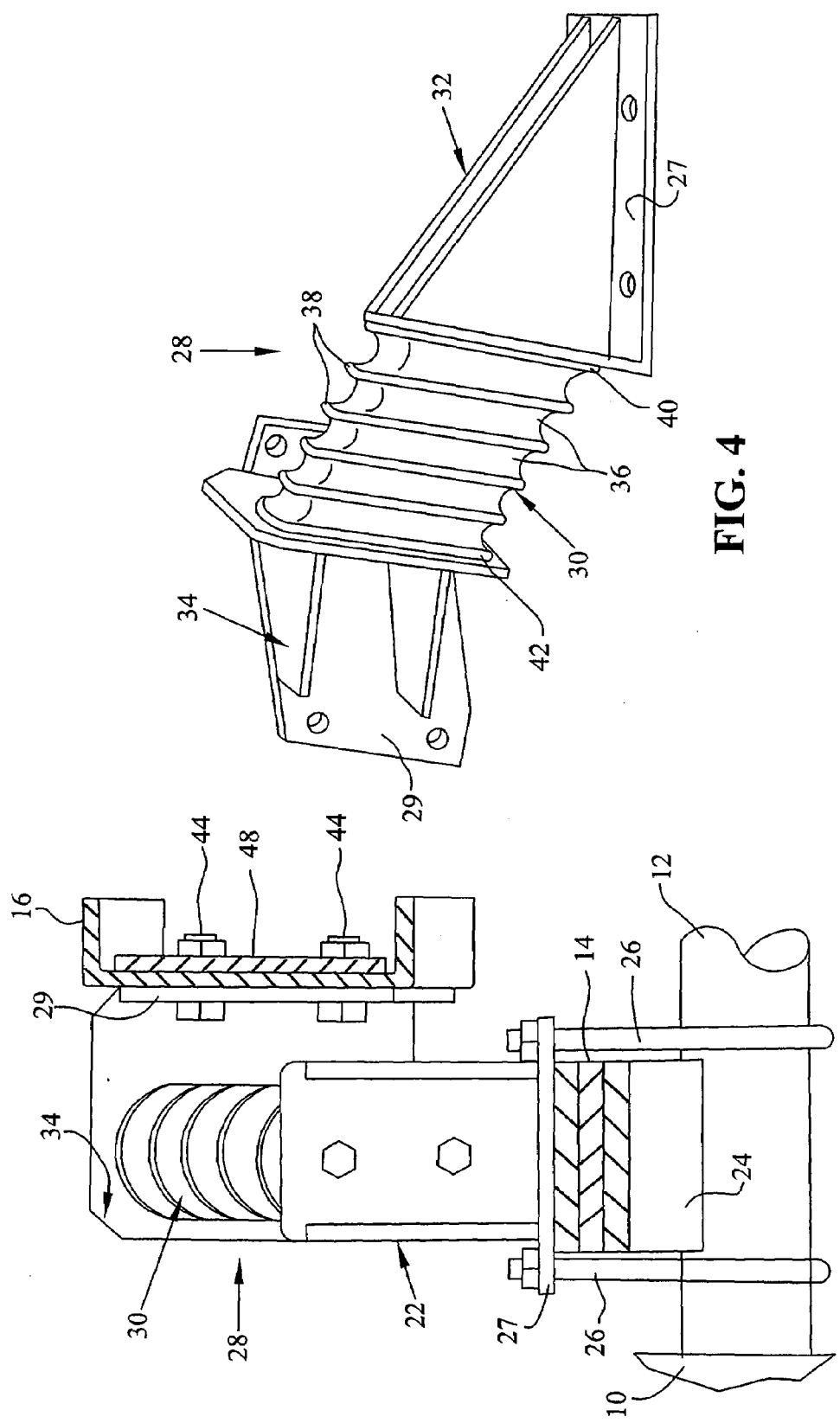

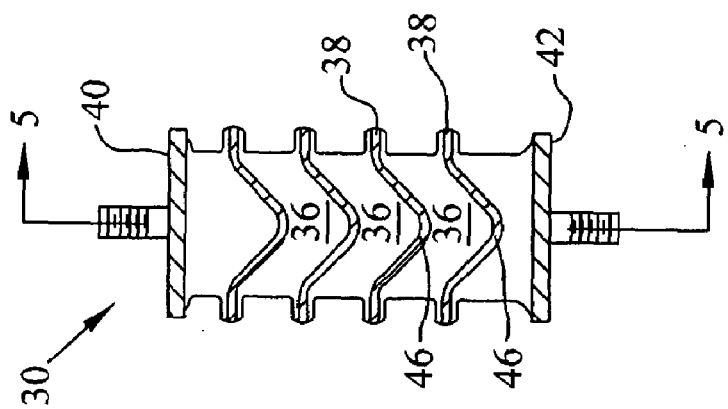
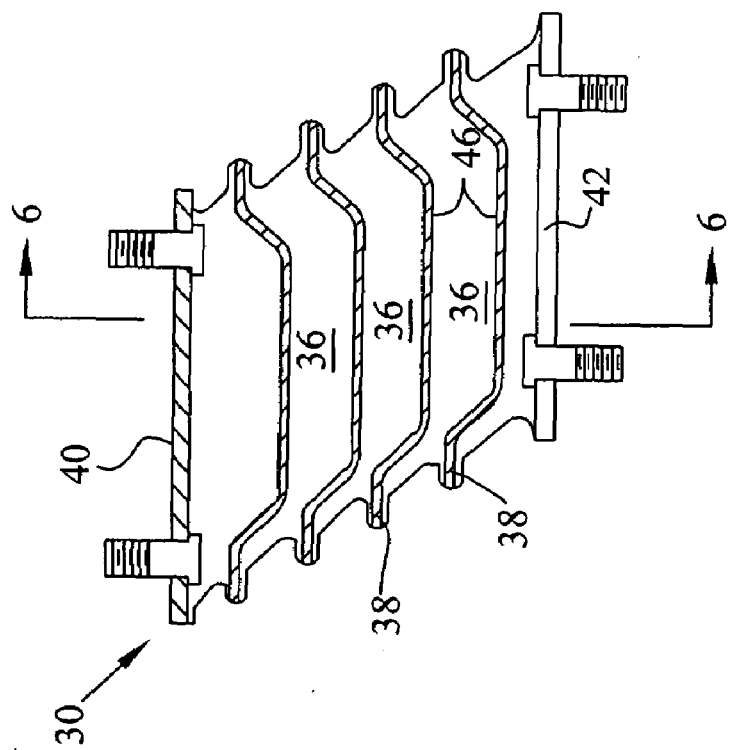
FIG. 5
FIG. 6

BOLSTER SPRING SUSPENSION ASSEMBLY

CROSS REFERENCE TO RELATED APPLICATIONS

This Application claims the benefit of Provisional U.S. Patent Application No. 60/482,956 filed 27 Jun. 2003 by Howard E. Sellers.

BACKGROUND OF THE INVENTION

1. Field of the Invention

The invention relates to a suspension system assembly for use with a leaf spring suspension system.

2. Discussion of the Prior Art

In vehicle suspension systems, the use of leaf springs and bolster springs is well known. For example one such use of a bolster spring is described in U.S. Pat. No. 5,676,356 to Ekonen. Ekonen discloses a suspension system in which a leaf spring is carried by the undercarriage of the vehicle. A bolster spring is connected between each end of the leaf spring and the underlying end of the axles.

Another example of a vehicle suspension system that utilizes both a leaf spring and a bolster spring is described in U.S. Pat. No. 6,079,723 to Choi. Choi discloses a suspension assembly for a vehicle having a leaf spring with a mounting block affixed to the end of the leaf spring. The mounting block is attached to a bolster spring, and the bolster spring is mounted to the vehicle frame with a bracket.

Both the Ekonen and Choi disclosures combine a leaf spring with a bolster spring to produce a suspension system that provides a smoother ride. However, in both of these disclosures the bolster spring is an integral part of the overall suspension system and can not be easily added to the system as an aftermarket item. It would be desirable, however, to have a method of retrofitting or mounting a bolster spring to an existing leaf spring suspension system without having to completely redesign the entire suspension system.

In early developments leading up to the invention, a layered rubber bolster spring was substituted for the hanger arm at the rear of a leaf spring such that the bolster spring was compressed to accommodate the upwardly flexing of the leaf spring that occurs when the wheel goes over a bump. This, however, provided unsatisfactory results in that it did not control the jounce, or roll of the vehicle chassis in relation to the axle, as well as desired. In addition, it required substantial modification of the entire suspension system.

SUMMARY OF THE INVENTION

A bolster spring suspension assembly is disclosed in which a bolster spring is adapted for mounting to a vehicle between the axle and the undercarriage as a supplement to a second suspension element securing the axle to the vehicle.

One object of the invention is to provide an improved suspension system for providing a smoother ride. Another object of the invention is to provide a way to modify an existing leaf spring suspension to provide a smoother ride. A further object of the invention is to provide a suspension system that reduces jounce.

BRIEF DESCRIPTION OF THE DRAWINGS

These and other aspects of the invention will be apparent from the following description, with reference to the accompanying drawings, in which:

FIG. 3 is a sectional view of the bolster spring suspension assembly as seen from line 3—3 of FIG. 2;

FIG. 4 is a side view of the bolster spring in isolation from the other parts of the suspension assembly;

FIG. 5 is a cross sectional view of the bolster spring as seen from the line 5—5 of FIG. 6; and FIG. 6 is a cross sectional view of the bolster spring as seen from the line 6—6 of FIG. 5.

DETAILED DESCRIPTION OF THE PREFERRED EMBODIMENT

Figure 1:
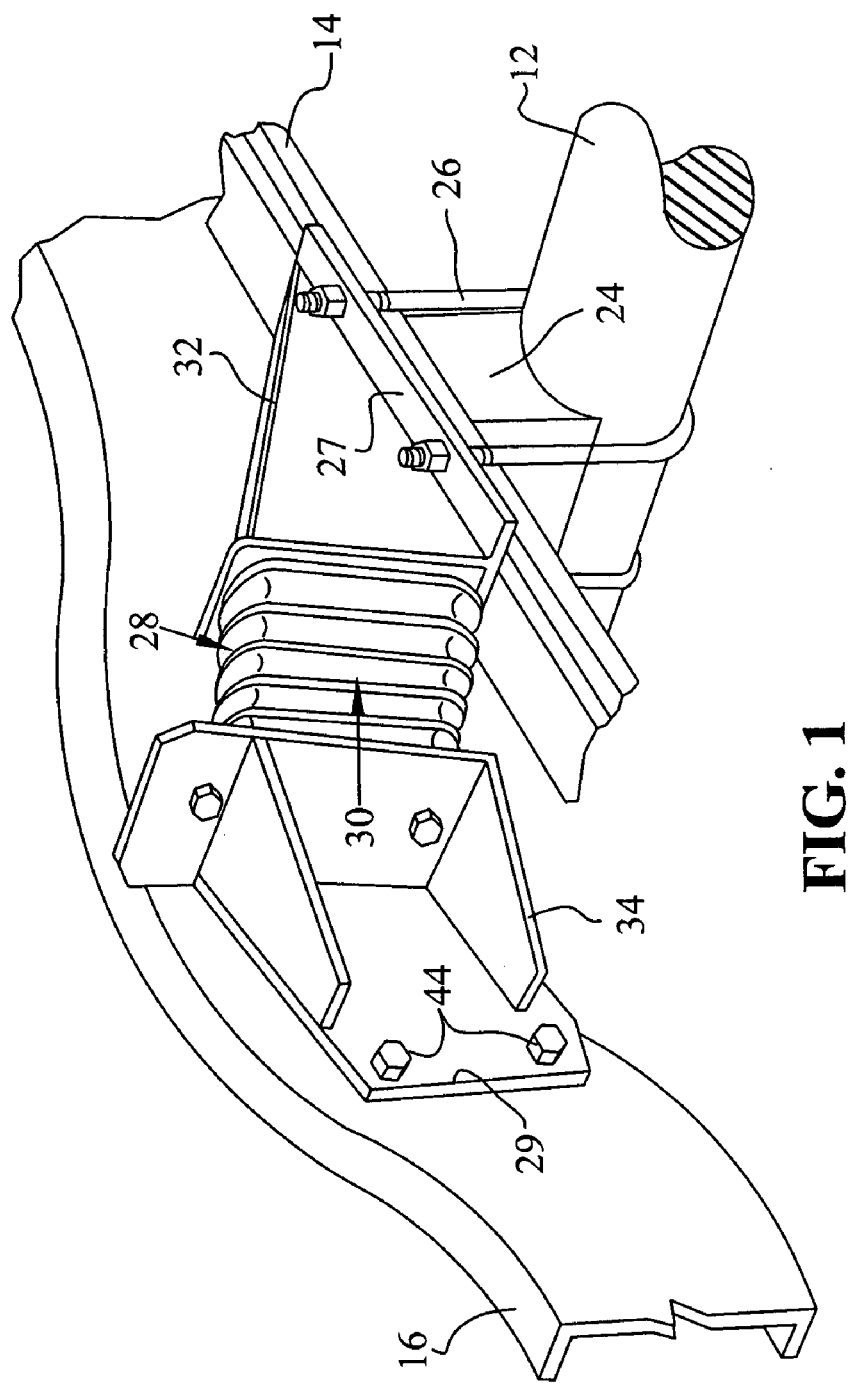
FIG. 1 is a perspective view of the bolster spring suspension assembly.

Referring now to the drawings, a vehicle as partially shown in FIGS. 1–4 includes a wheel 10 shown in broken line form for illustrative purposes mounted to an axle 12. The suspension system for the wheel includes a leaf spring 14 secured to a vehicle frame member 16 with a fixed mounting bracket 18 connected to one end of the leaf spring and a shackle 20 connected to the opposite end of the leaf spring and carried by a second mounting bracket 22 attached to the frame member. Axle 12 is secured to leaf spring 14 with a leaf spring support block 24 disposed between the leaf spring and the axle and a pair of U-bolts 26 on either side of the leaf spring fastened around the axle. The U-bolts 26 extend through the anchor plate 27 of a bolster spring suspension assembly 28 to secure the axle to the leaf spring 14. The opposite end 29 of suspension assembly 28 is secured to frame member 16 with bolts 44. End 29 of suspension assembly 28 is shown both laterally and vertically spaced from the opposite end with anchor plate 27.

Suspension assembly 28 as shown in FIG. 5 includes a bolster spring 30 and mounting brackets 32, 34 secured to opposite ends of the bolster spring. Bolster spring 30 includes a plurality of resilient core members 36, separator plates 38 between adjacent core members, and end plates 40, 42 on either end of the bolster spring. Core members 36 and separator plates 38 are alternatingly stacked with each core laterally offset a similar distance from its adjacent core thereby forming an angularly disposed or diagonally oriented bolster spring 30. Resilient core members 36 are a rubber like substance that encase the metal plate separator plates 38. Separator plates 38 are preferably cupped or have indentions 46 in the core area to provide resistance to shear forces exerted parallel to the plane of the separator plates, as best seen in FIGS. 5 and 6. Bolster spring 30 is known in the art and is preferably of the type distributed under the trade name HMX BOLSTER SPRING KIT by Hendrickson International Truck Suspension Systems located in Woodridge, Ill., but other similarly constructed bolster springs could also be used. Mounting bracket 32 includes anchor plate 27 which is adapted to be clamped over leaf spring 14 with U-bolts 26. End 29 of mounting bracket 34 is adapted to be attached to frame member 16 with bolts 44.

Figure 2:
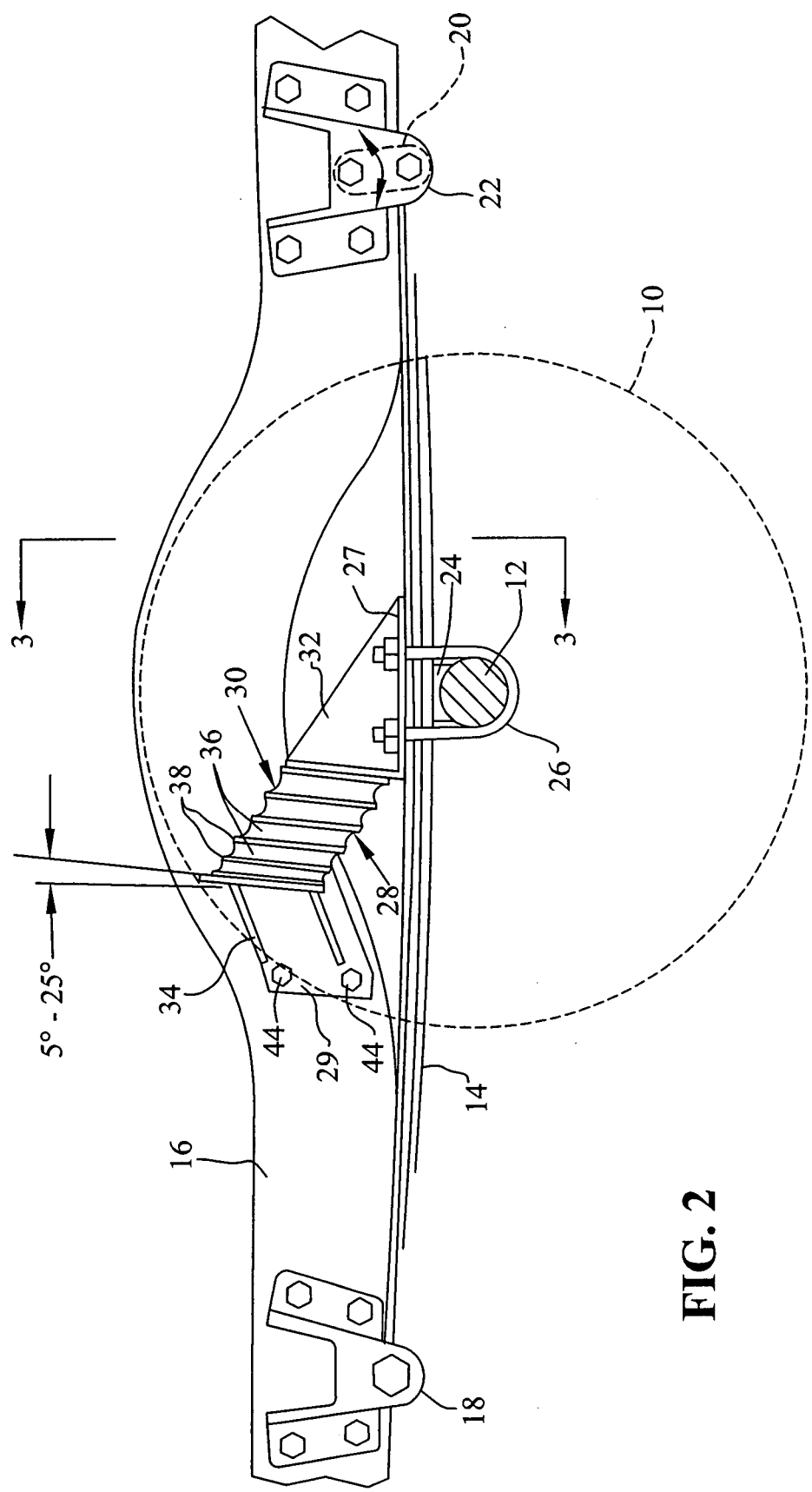
FIG. 2 is a side view of the bolster spring suspension assembly under a normal load or downwardly flexed condition.

As best shown in FIG. 2, mounting brackets 32, 34 are adapted such that bolster assembly 28 may be mounted over axle 12 between frame member 16 and leaf spring 14 with separator plates 38 positioned essentially vertically and bolster spring 30 extending toward mounting bracket 18 and upwardly from axle 12, or generally diagonally, between mounting bracket 32 and mounting bracket 34. The angle of separator plates 38 with respect to vertical affects the resulting ride and jounce control of the vehicle. As the plates approach the vertical, the ride becomes smoother, but jounce is controlled less and the carrying capacity decreases. As the plates deviate from the vertical, jounce is controlled more and carrying capacity increases, but the ride becomes less smooth. In the preferred embodiment for a class 7 chassis, plates 38 are positioned between approximately 5° and 25° from the vertical to produce both a smooth ride and provide substantial jounce control. In this position and location, bolster spring 30 may deform in both shear and compression when axle 12 is urged generally upwardly with respect to frame member 16 as illustrated by arrow 33 shown in FIG. 3. The majority of the deformation of bolster spring 30 is in shear caused by the vertical movement of axle 12. A significantly smaller amount of compressive deformation in bolster spring 30 may be caused due to other various forces. In addition, a small compressive deformation in bolster spring 30 may be caused by the rotation of bracket 32 about mounting bracket 18 as leaf spring 14 is flexed upwardly. In this configuration, bolster spring 30 will be engaged immediately upon any vertical shifting of axle 12 with respect to the frame 16.

Bolster spring suspension assembly 28 may be either installed as original equipment or easily retrofitted or attached to an existing leaf spring suspension system. When retrofitting suspension assembly 28 to an existing leaf spring suspension, the original mounting brackets for U-bolts 26 are removed and appropriate holes for bolts 44 are formed in frame member 16. A backing plate 48, best seen in FIG. 3, is preferably fastened to the side of frame member 16 opposite mounting bracket 34 with bolts 44 in order to compensate for additional stresses imparted on the frame by the bolster spring suspension assembly. Backing plate 48 is adapted to have holes (not shown) for accepting each bolt 44, and is preferably the same shape as end 29 of bracket 34 for simple manufacture. Assembly 28 is then mounted as shown and previously described by securing U-bolts 26 to anchor plate 27 and securing bracket 34 to frame 16.

The description given herein is not considered to be a limitation on other minor and obvious variations, but is only meant to exemplify and encompass the full scope of the invention as set forth in the claims.

I claim:

1. A suspension assembly mounted to a vehicle having a leaf spring suspension system including a wheel journalled to an axle, a leaf spring secured to said axle, said leaf spring having opposite ends, said leaf spring secured at one of said ends to an undercarriage of said vehicle, said suspension assembly comprising a single resilient bolster spring having opposite ends interposed between said leaf spring and said undercarriage, one of said ends of said bolster spring secured to said leaf spring over said axle, the other of said ends of said bolster spring extending over and along said leaf spring and being secured to said undercarriage wherein the suspension assembly includes only one resilient bolster spring connected to both said leaf spring and said undercarriage.

2. The suspension assembly of claim 1 and further comprising a first bracket on said one end of said bolster spring secured to said leaf spring, and a second bracket on said other end of said bolster spring secured to said undercarriage.

3. The suspension assembly of claim 2 wherein said second bracket is offset vertically and laterally from said first bracket.

4. The suspension assembly of claim 1 wherein said other end of said bolster spring is spaced higher than said one end of said bolster spring and extends toward said one end of said leaf spring.

5. The suspension assembly of claim 1 wherein said bolster spring further comprises a plurality of stacked resilient cores, each core laterally offset from said core's adjacent core, a rigid separator plate between each said core, said cores and separator plates maintained between a first endplate forming said one end of said bolster spring and a second endplate forming said other end of said bolster spring.

6. The suspension assembly of claim 5 wherein said cores and separator plates are generally vertically disposed, said other end of said bolster spring spaced forwardly and upwardly apart from said one end of the bolster spring.

7. The suspension system of claim 5 wherein said cores and separator plates are angularly offset from a vertical orientation between about five degrees and twenty five degrees.

8. A method of securing a single bolster spring assembly to a suspension system of a vehicle, said suspension system including a wheel journalled to an axle, said axle secured to an undercarriage of said vehicle with a resilient suspension means including a leaf spring, said bolster spring including a plurality of stacked planar resilient cores, each core laterally offset from said adjacent core; a rigid planar separator between each adjacent pair of said cores; said cores and separators maintained between a first endplate and a second endplate; a bracket carried by said first endplate adapted for connection to said leaf spring over said axle, a second bracket carried by said second endplate adapted for connection to said undercarriage, said method comprising the steps:
a. securing said second bracket to said undercarriage such that said bolster spring assembly is angularly positioned between said axle and said undercarriage; and b. securing said first bracket to said leaf spring over said axle wherein no other bolster spring assemblies are connected to both said leaf spring and said undercarriage.

9. A suspension system configured to be added to a vehicle including a vehicle frame, a leaf spring connected to the vehicle frame at a first end and a second end, and an axle connected to the leaf spring intermediate the first end and the second end by way of at least one u-bolt, the suspension system comprising:
a single bolster spring assembly comprising a bolster spring positioned intermediate a first bracket and a second bracket, said first bracket being connected to the leaf spring and said second bracket being connected to the vehicle frame;
wherein said single bolster spring is the only bolster spring connecting the leaf spring to the vehicle frame.

10. The suspension system as set forth in claim 9, wherein the second bracket is connected to the vehicle frame forward of the axle.

11. The suspension system as set forth in claim 9, wherein the u-bolt connects said first bracket to the leaf spring.

12. The suspension system as set forth in claim 11, wherein said first bracket includes a pair of mounting holes configured to receive the u-bolt.

13. The suspension system as set forth in claim 9, wherein said second bracket is located forward of said first bracket.

14. The suspension system as set forth in claim 9, further including a leaf spring support block intermediate the axle and the leaf spring.

15. The suspension system as set forth in claim 9, wherein the first bracket includes a horizontal plate adjacent the leaf spring and a vertical plate connected to said bolster spring.

16. A suspension system configured to be added to a vehicle including a vehicle frame, a leaf spring connected to the vehicle frame at a first end and a second end, and an axle connected to the leaf spring intermediate the first end and the second end by way of at least one u-bolt, the suspension system comprising:

a single bolster spring assembly comprising a bolster spring positioned intermediate a first bracket and a second bracket, said first bracket being connected to the leaf spring and said second bracket being connected to the vehicle frame wherein the first bracket includes a horizontal plate adjacent the leaf spring, a vertical plate connected to said bolster spring and a pair of plates in a vertical plane having an upper surface extending from a rear edge of said horizontal plate to a top edge of said vertical plate.

17. The suspension system as set forth in claim 16, wherein said horizontal plate includes a pair of mounting holes positioned on a single side of said pair of plates.

* * * * *